US009565847B2

(12) United States Patent
Ballu

(10) Patent No.: US 9,565,847 B2
(45) Date of Patent: Feb. 14, 2017

(54) AGRICULTURAL SPRAYING MACHINE AND METHOD FOR SPRAYING A PHYTOSANITARY LIQUID ON LAND CULTIVATED BY MEANS OF SUCH A MACHINE

(71) Applicant: EXEL INDUSTRIES, Epernay (FR)

(72) Inventor: Patrick Ballu, Reims (FR)

(73) Assignee: EXEL INDUSTRIES, Epernay (FR)

( * ) Notice: Subject to any disclaimer, the term of this patent is extended or adjusted under 35 U.S.C. 154(b) by 0 days.

(21) Appl. No.: 15/073,421

(22) Filed: Mar. 17, 2016

(65) Prior Publication Data

US 2016/0198694 A1 Jul. 14, 2016

Related U.S. Application Data

(63) Continuation of application No. 13/824,916, filed as application No. PCT/FR2010/052296 on Oct. 3, 2011.

(30) Foreign Application Priority Data

Oct. 5, 2010 (FR) ...................................... 10 58072

(51) Int. Cl.
*A01M 7/00* (2006.01)
*A01C 23/00* (2006.01)

(52) U.S. Cl.
CPC ............ *A01M 7/0057* (2013.01); *A01C 23/00* (2013.01); *A01M 7/0089* (2013.01)

(58) Field of Classification Search
CPC .......................... A01M 7/0089; A01M 7/0057

USPC .......... 239/1, 73, 159–169, 172, 225.1, 264, 239/265; 700/283
See application file for complete search history.

(56) References Cited

U.S. PATENT DOCUMENTS 4,561,591 A * 12/1985 Ballu .................. A01M 7/0053
239/159
5,348,226 A * 9/1994 Heiniger ............. A01M 7/0057
239/1
5,931,882 A * 8/1999 Fick ..................... A01B 79/005
111/903

(Continued)

FOREIGN PATENT DOCUMENTS

DE      41 40 254 A1   8/2004
EP       1 444 894 A1   8/2004
WO   WO 2011/073751 A2   6/2011

*Primary Examiner* — Arthur O Hall
*Assistant Examiner* — Tuongminh Pham
(74) *Attorney, Agent, or Firm* — Arent Fox LLP

(57) ABSTRACT

The invention relates to an agricultural machine for spraying a phytosanitary liquid over a crop planted in a section of land, comprising a spray boom having at least one arm, a mechanism for raising/lowering the boom and, for each arm, a mechanism for inclining the arm, a manual system for controlling each inclining body, and a receiver for communicating with a geolocalization system and a control unit. Each arm is provided with at least one sensor measuring a distance between said sensor and the surface of the land or vegetation planted in the land, and an element for measuring a datum relating to the incline of the arm. The control unit is connected to each sensor, to the receiver and to the measuring element, is provided with a storage memory, and is able to control each inclining mechanism and the raising/lowering mechanism according to the information stored in the memory.

13 Claims, 2 Drawing Sheets

(56) References Cited

U.S. PATENT DOCUMENTS

| | | | | |
|---|---|---|---|---|
| 5,950,921 | A * | 9/1999 | Cain ................... | A01M 7/0089 239/1 |
| 6,236,907 | B1 * | 5/2001 | Hauwiller ............ | A01B 79/005 111/200 |
| 8,924,030 | B2 * | 12/2014 | Wendte ................ | A01B 79/005 700/283 |
| 2004/0158381 | A1 * | 8/2004 | Strelioff .............. | A01M 7/0057 701/50 |
| 2007/0255494 | A1 * | 11/2007 | Politick ..................... | E02F 3/43 701/469 |

* cited by examiner

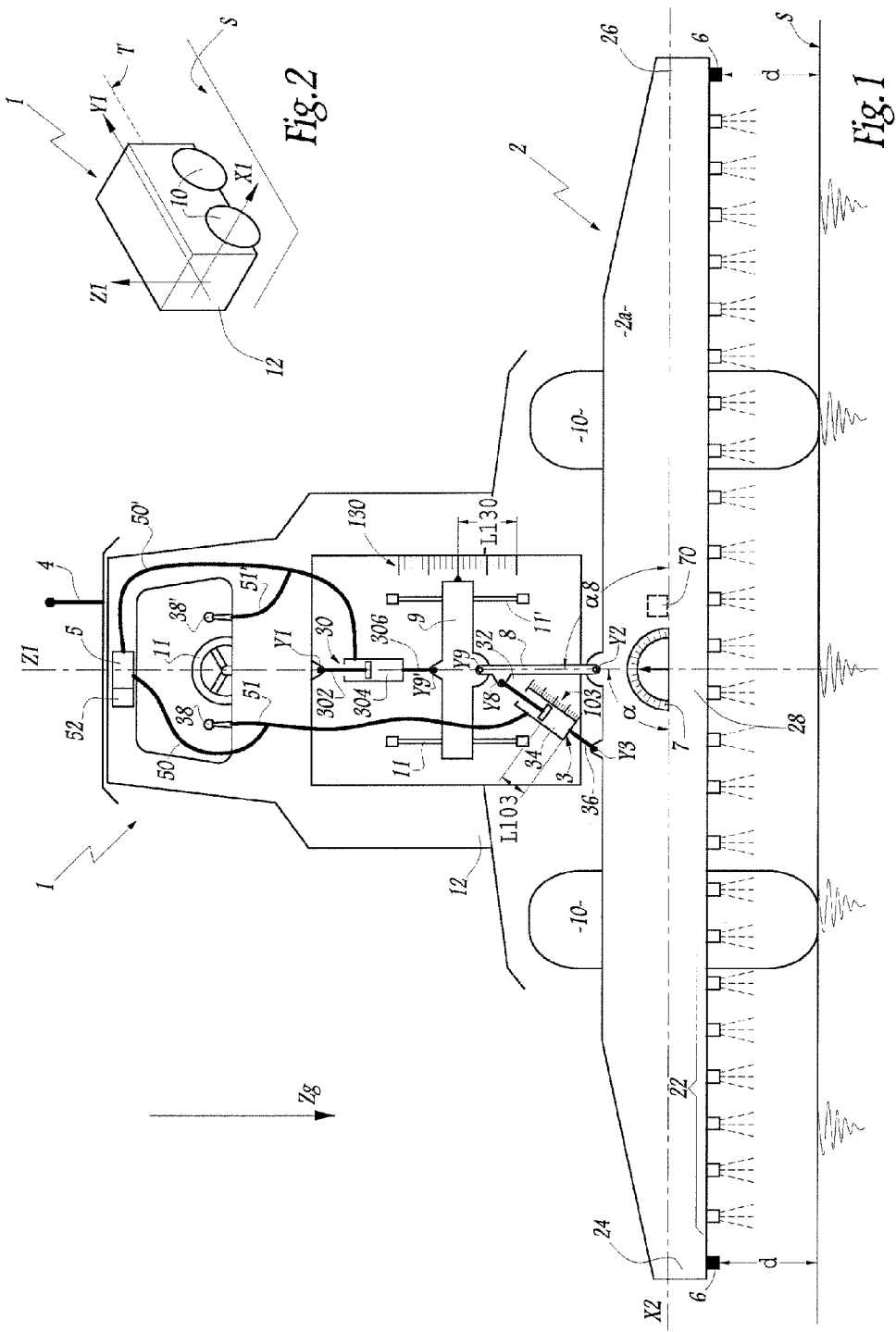

AGRICULTURAL SPRAYING MACHINE AND METHOD FOR SPRAYING A PHYTOSANITARY LIQUID ON LAND CULTIVATED BY MEANS OF SUCH A MACHINE

CROSS-REFERENCE TO RELATED APPLICATION

This application is a Continuation of U.S. patent application Ser. No. 13/824,916, filed Jul. 10, 2013, which is a National Stage entry of International Application No. PCT/FR2011/052296, filed Oct. 3, 2011, which claims the benefit of priority to French Patent Application No. 10 58072, filed Oct. 5, 2010. The disclosures of the prior applications are hereby incorporated in their entirety by reference.

This invention relates to an agricultural spraying machine as well as a method for spraying a phytosanitary liquid on cultivated land by means of such a machine.

It is known to use an agricultural machine provided with a spray boom in order to spread a phytosanitary liquid on vegetation planted in land that can comprise irregularities, for example holes or bumps, and of which the slope can vary.

In order for the distribution of the phytosanitary liquid on the vegetation to be satisfactory, the boom must not be too far from the vegetation, in such a way as to avoid the dispersion of drops of phytosanitary liquid into the atmosphere. Moreover, if the boom is too close to the land, it risks colliding with the land and/or the vegetation, which would damage the spray boom and which could plug up the spraying nozzles of the boom.

Traditionally, an agricultural spraying machine is provided with a cylinder in order to incline its spray boom in relation to its frame, which allows the boom to adapt to the variations in the geometry of the land. The user, when he sprays the phytosanitary liquid on the vegetation, manually controls the elevation of the spray boom, i.e. its inclination, so that it is not too close or too far from the vegetation and from the land.

However, when the user sprays the phytosanitary liquid on the vegetation, manually controlling the inclination of the boom is not easy because the user simultaneously controls the machine, such as a tractor, along a trajectory. In addition, the user always aims to go as quickly as possible and cannot excessively reduce the speed of the machine. When the boom comprises several articulated arms, the controlling is even more difficult because the user manually controls the variable geometry of the boom, i.e. the inclination of the various arms.

According to another aspect, due to the inertia of the boom which remains tilted in order to not transfer the irregularities of the land under the wheels of the machine, each modification in the elevation of the boom, and where applicable in its variable geometry, results in a moving of the centre of gravity and a tipping of the boom beyond the angle corrected manually by the user. This causes oscillations, similar to those of a pendulum, which can thrust one of the ends of the boom into the land. These oscillations can, furthermore, complicate and slow down the correct adjustment of the correction for the elevation and/or the variable geometry of the boom. This disadvantage is also present in the known systems for automatic elevation correction, such as the one disclosed in document DE-A.-41 40 254.

Moreover, when the user manually controls the inclination of the boom during the spraying, the boom and its suspension are unstable as they are subject to the effects of the inertia, which is not satisfactory. These effects are accentuated by the speed of the machine.

It is these disadvantages that the invention intends more particularly to overcome by proposing an agricultural spraying machine and a method for spraying allowing for easy and optimised spraying, and which limits the risks of collision between the boom and the land.

To this effect, the invention has for purpose an agricultural machine for spraying a phytosanitary liquid on cultivated land, comprising
   means for moving the machine over the surface of the land,
   a spray boom of the phytosanitary liquid comprising at least one arm,
   for the arm or at least one of the arms of the boom, a mechanism for inclining the arm in relation to a frame of the agricultural machine,
   a mechanism for raising/lowering the boom according to a first fixed axis in relation to the frame of the machine and vertical, and even substantially vertical when the machine is on a flat horizontal surface or in relation to a second axis of the same direction as the earth's gravity field,
   a manual system for controlling each mechanism for inclining and for the mechanism for raising/lowering,
   a receiver able to communicate with a global positioning system and
   a control unit,
   the arm or at least one of the arms of the boom is provided with at least one sensor, each sensor measuring a distance between the surface of the land and this sensor or, where applicable, between vegetation planted in the land and this sensor.
   The arm or at least one of the arms of the boom is provided with an element for measuring data concerning the inclination, in the plane perpendicular to the forward direction, of a longitudinal axis of this arm.
   The control unit is:
   connected to each sensor, to the receiver and to the measuring element,
   provided with a storage memory for information provided by each sensor, by the receiver and by each measuring element, and
   able to control each mechanism for inclining and the mechanism for raising/lowering according to the information stored in the memory.

Thanks to the invention, the information collected by the receiver, the sensors and the measuring element allow the boom, during the spraying, to automatically adapt to the variations in the geometry of the land and to optimally position itself for a satisfactory spray.

According to advantageous but not mandatory aspects of the invention, such an agricultural machine can incorporate one or several of the following characteristics, taken in any combination technically permissible:
   At least one mechanism for inclining and/or the mechanism for raising/lowering comprises a hydraulic or electrical cylinder.
   The arm or at least one of the arms of the boom is provided with two sensors.
   The mechanism for raising/lowering and/or the mechanism or at least one mechanism for inclining is provided with a system for measuring a magnitude corresponding to a configuration of this or these mechanisms.

The invention also has for purpose a first method for spraying a phytosanitary liquid on a crop planted on a land by means of a machine according to the invention, comprising:
- an initial step a), wherein, before the spraying, the user enters into the control unit the value of a minimum distance and the value of a maximum distance greater than the minimum distance,
- a prior step b) wherein,
- the machine travels over the surface of the land, at a first speed, according to a determined trajectory, in such a way that the boom sweeps the entire surface, the user manoeuvring, over the entire trajectory, the manual system for controlling each mechanism for inclining and/or the manual system for controlling the mechanism for raising/lowering, in such a way that the distance between each sensor and the surface or the vegetation is between the maximum distance and the minimum distance,
- the control unit records in its memory, for sampled positions of the machine along the trajectory, on the one hand, the distance between each sensor and the land or the vegetation and, on the other hand, at least one piece of data relative to the inclination of each arm,
- a step of spraying c), after the step b), wherein, during the spraying:
- the machine travels over the surface, at a second speed greater than or equal to the first speed, according to the trajectory taken during the prior step b) and
- for each sampled position in prior step b) and according to the data stored in the memory, the control unit controls, ahead of time, the mechanism for raising/lowering and each mechanism for inclining, in such a way that the distance between each sensor and the land or the vegetation is between the maximum distance and the minimum distance.

According to advantageous but not mandatory aspects of the invention, such a method can incorporate one or several of the following characteristics, taken in any combination technically permissible:
- During the step of spraying c), the control unit controls ahead of time each mechanism for inclining in such a way that, for each sampled position in prior step b), the inclination of each arm is similar to the inclination of each arm defined by the user during the prior step b).
- During the prior step b), the control unit records in its memory, for sampled positions of the machine along the trajectory, at least one magnitude corresponding to a configuration of the mechanism for raising/lowering and/or of at least one or of the mechanism for inclining, and during the step of spraying c), for each sampled position in prior step b), the control unit automatically controls and ahead of time the mechanism for raising/lowering and/or at least one or the mechanism for inclining in such a way that each magnitude is equal to the other magnitudes recorded during the prior step b).
- During the initial step a), the user enters into the control unit the value of an optimum distance between the minimum distance and the maximum distance and, during the step of spraying c), the control unit automatically controls and ahead of time each mechanism for inclining and the mechanism for raising/lowering in such a way that, for each sampled position in prior step b), the distance measured by each sensor is substantially equal to the optimum distance.
- During the initial step a), the user enters into the control unit the value of an optimum distance between the minimum distance and the maximum distance and, during the prior step b), as soon as the distance measured by at least one sensor is less than the minimum distance, the control unit automatically controls and with priority the mechanism for raising/lowering in order to separate the boom from the surface until the distance measured by each sensor is greater than or equal to the optimum distance.
- During the initial step a), the user enters into the control unit the value of an optimum distance between the minimum distance and the maximum distance and, during the prior step b), the control unit automatically controls the mechanism for raising/lowering and/or the or at least one mechanism for inclining in such a way that the distance measured by each sensor is substantially equal to the optimum distance, with the user manoeuvring the manual system for controlling the mechanism for raising/lowering and/or the manual system for controlling each mechanism for inclining in order to correct the controlling of the control unit.

The invention also has for purpose a second method for spraying a phytosanitary liquid on vegetation planted on a land by means of a machine according to the invention. This second method comprises:
- an initial step a2), wherein, before the spraying, the user enters into the control unit the value of a minimum distance and the value of an optimum distance greater than the minimum distance,
- a prior step b2), after the initial step a2), wherein,
- the machine travels over the surface of the land, at a first speed, according to a predetermined trajectory, in such a way that the boom sweeps the entire surface,
- as soon as the distance measured by at least one sensor is less than the minimum distance entered during the initial step a2), the control unit controls the mechanism for raising/lowering, until the distance measured by this or these sensors is equal to the optimum distance,
- the user manoeuvres the manual system for controlling each mechanism for inclining in such a way that the distance measured by each sensor is globally equal to the optimum distance,
- at each time that the user actuates the manual control system of a mechanism for inclining, the control unit records in its memory the position of the machine along the trajectory and either a duration of this actuation, or a distance travelled by the machine during this actuation and, a few seconds after the end of this actuation, the control unit records in its memory a first piece of data relative to the inclination of the arm corresponding to the manual control system actuated,
- a step of spraying c2), after the prior step b2), wherein, during the spraying,
- the machine travels over the surface of the land, at a second speed greater than or equal to the first speed, according to the trajectory travelled during the prior step b2) and
- when the machine reaches one of the positions recorded during the prior step b2), the control unit controls the mechanism for inclining, actuated for this position by the user in prior step b2), either during a duration equal to the corresponding duration of actuation recorded during the prior step b2), or until the machine has travelled a distance equal to the corresponding distance travelled during the prior step b2), and, a few seconds after the end of the actuation, the control unit compares a second piece of data relative to the inclination of the corresponding arm with the first piece of corresponding data recorded during the prior step b2) and, if the second pieces of data differs by plus or minus 1% from the first piece of data, the control unit controls this mechanism for inclining in a direction to reduce the difference between the second piece of data and the first piece of data.

According to advantageous but not mandatory aspects of the invention, such methods can incorporate one of several of the following characteristics, taken in any combination technically permissible:

The minimum distance is between 30 cm and 70 cm, preferably of a magnitude of 50 cm.

The optimum distance is between 50 cm and 100 cm, preferably of a magnitude of 70 cm.

The maximum distance is between 70 cm and 150 cm, preferably of a magnitude of 100 cm.

The invention shall be better understood and other advantages of the latter shall appear more clearly when reading the following description of an agricultural spraying machine and of a method for spraying accordance with its principle, provided solely by way of example and in reference to the annexed drawings wherein:

FIG. 1 is a rear view of an agricultural machine according to the invention;

FIG. 2 is a perspective view that diagrammatically shows the machine of FIG. 1.

Figure 3:
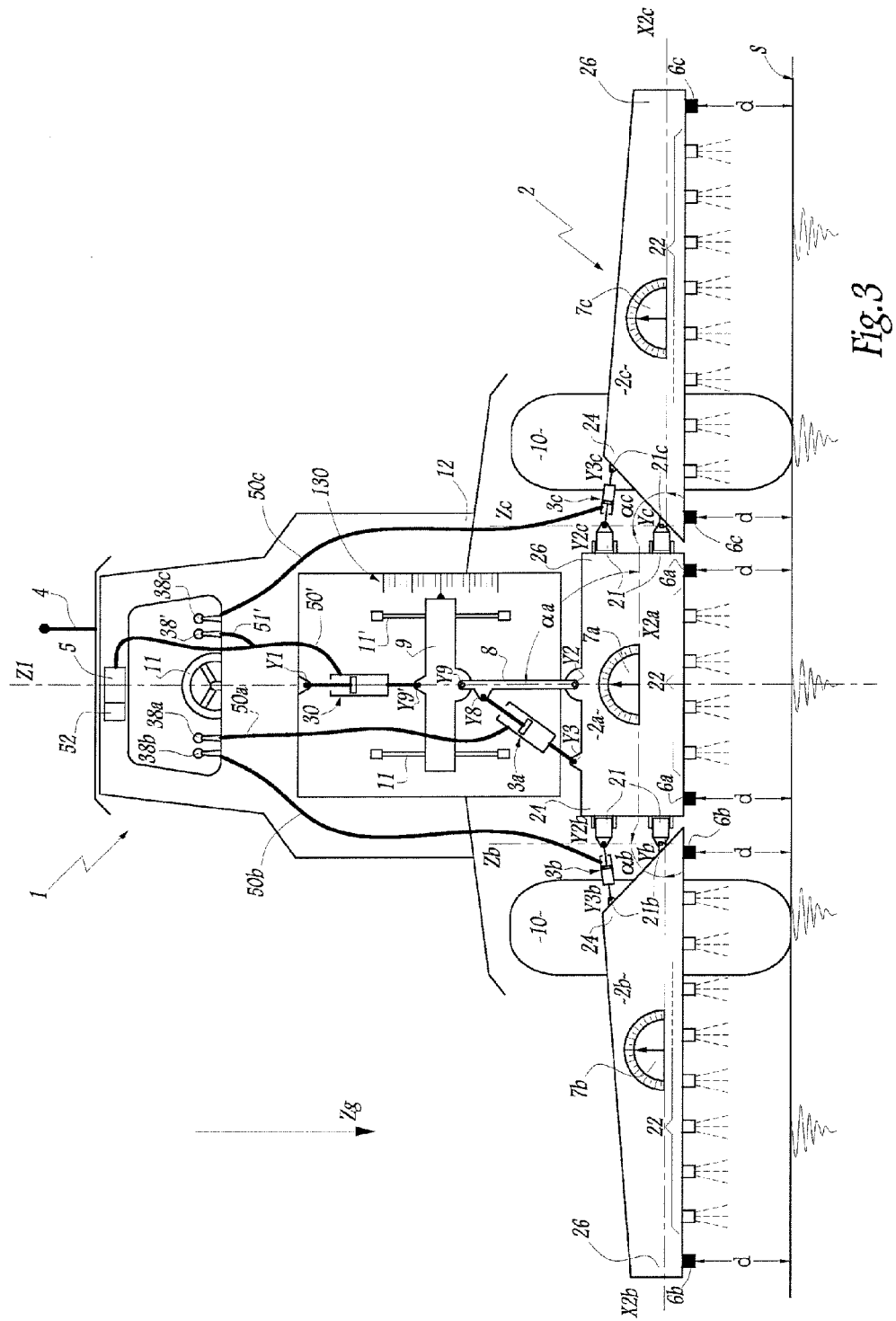
FIG. 3 is a view similar to FIG. 1 of an agricultural machine in accordance with a second embodiment of the invention.

FIG. 1 shows an agricultural machine 1 for spraying a phytosanitary liquid which is provided with a spray boom 2 located to the rear of the machine 1. Alternatively, the boom 2 is located in front of the machine 1. The machine 1 is also provided with a motor not shown which belongs to the means for moving the machine 1 on land, with a transmission, a steering wheel 11 and wheels 10. The machine 1 is therefore self-propelled and autonomous, but alternatively the boom 2 can be supported by a trailer hitched to any self-propelled machine. The machine 1 is a tractor, but other machines can be used.

As shown in FIG. 2, whereon the machine 1 is shown diagrammatically, X1 denotes a transversal axis of the machine 1, perpendicular to its forward motion in a straight line, Y1 a longitudinal axis of a frame 12 of the machine 1, parallel to a forward direction in a straight line of the machine 1, and Z1 a first axis of the machine 1 perpendicular to the axes X1 and Y1. The axes X1, Y1 and Z1 are fixed in relation to the frame 12 of the machine 1.

In FIGS. 1 and 2, the machine 1 is on the surface S of a flat and horizontal land whereon vegetation, not shown, can be planted. The transversal axis X1 of the frame 12 of the machine 1 is therefore horizontal, and even slightly inclined, and the axis Z1 is then vertical, even slightly inclined to the side, or substantially vertical. However, when the inclination of the surface S varies, the axis Z1 is inclined in relation to the vertical.

Zg denotes a second vertical axis, of which the direction corresponds to the earth's gravity field. In FIG. 1, the axis Z1 is parallel to the axis Zg.

The machine 1 is provided with a control unit 5 which comprises a memory 52 for storing information.

The machine 1 is provided with a receiver 4 able to communicate with a global positioning system not shown. The global positioning system can be of the Global Positioning System (G.P.S.) type. The receiver 4, associated with the global positioning system, makes it possible to locate the position of the machine 1 on the surface S.

In the rest of the description, the elements qualified as lower are located closer to the surface S than the elements qualified as upper.

The boom 2 comprises a single arm 2a which extends along a longitudinal axis X2, substantially parallel to the axis X1 when the machine 1 is on flat and horizontal land. Means of spraying 22 are distributed on the boom 2, along the longitudinal axis X2, and project a phytosanitary liquid onto the surface S.

The boom 2 is provided with two sensors 6. A first sensor 6 is located on a first end 24 of the boom 2 and a second sensor 6 is located on the other end 26 of the boom 2. A third optional sensor 6, not shown, is located between the first two sensors, in a median zone 28 of the boom 2. Each sensor 6 makes it possible to measure a distance d between the sensor 6 and the surface S or, where applicable, between this sensor 6 and vegetation planted in the land. The sensors 6 and the means of spraying 22 are, advantageously but not mandatorily, located in the same plane perpendicular to the axis Z1. In FIG. 1, as the longitudinal axis X2 of the boom 2 is parallel to the surface S, the distances d measured by each sensor 6 are identical.

In an alternative not shown, the sensors 6 and the means of spraying 22 are located in a plane that is slightly inclined in relation to a plane perpendicular to the axis Z1. In addition, the sensors 6 can be offset according to the axis Z1 in relation to the means of spraying 22. In this case, the control unit 5 is informed of this offset.

In an alternative not shown, the boom 2 can include several sections articulated together around axes parallel to the axis Z1, in such a way that it is possible to fold back the boom 2 in order to reduce its length, which is advantageous when the machine 1 is travelling on a narrow road.

A connecting rod 8, parallel to the axis Z1 in the configuration of FIG. 1, is articulated in rotation, on its lower end, with the boom 2, around an axis Y2 parallel to the axis Y1. The boom 2 is provided with an optional sensor 70, shown as a dotted line in FIG. 1, in order to measure an angle of correction α8 defined between the connecting rod 8 and the longitudinal axis X2 of the boom 2. The angle of correction α8 is located to the right of the connecting rod 8 in FIG. 1. The sensor 70 is connected to the control unit 5 by a wired or wireless connection not shown, and makes it possible to measure data relative to the inclination of the arm 2a of the boom 2. The upper end of the connecting rod 8 is articulated in rotation, around an axis Y9 parallel to the axis Y1, with a slideway 9. The slideway 9 is mobile in translation according to the axis Z1 in relation to the frame 12 of the machine 1. To do this, the slideway 9 cooperates with two rails 11 and 11' parallel to the axis Z1 and which are fixed to the frame 12. The rails 11 and 11' are located on either side of the axis Z1.

The machine 1 is provided with a mechanism for inclining the boom 2 in a plane X1-Z1 perpendicular to the forward direction Y1 of the machine 1. The plane X1-Z1 is parallel to the axes X1 and Z1. The mechanism for inclining allows for the inclination of the boom 2 in relation to the frame 12 of the machine 1 and comprises a first cylinder 3 which can be hydraulic or electrical, but other actuators can be suitable.

The first cylinder 3 comprises a rod 32 and a body 34. The rod 32 comprises an upper end, located opposite the body 34, articulated in rotation with the connecting rod 8 around an axis Y8 parallel to the axis Y1 and located in the vicinity of the axis Y9. The body 34 of the first cylinder 3 is connected to the boom 2 by a bar 36. A lower end of the bar 36, opposite the body 34 of the cylinder 3, is articulated in rotation with the boom 2 around an axis Y3 parallel to the axis Y1. The cylinder 3 therefore allows for the rotation of the boom 2 around the axis Y2. The axis Y3 is offset along the longitudinal axis X2 of the boom 2, in the direction of the first end 24 of the boom 2, in relation to the axis Y2.

The first cylinder 3 is provided with an optional measuring system 103 which makes it possible to measure a distance L103 corresponding to the position of the rod 32 of the first cylinder 3 in relation to the body 34 of the first cylinder 3. The measuring system 103 is connected to the control unit 5 by a connection not shown which can be wired or wireless. The magnitude L103 corresponds to a configuration of the first cylinder 3, i.e. to a particular arrangement of the rod 32 in relation to the body 34 of the first cylinder 3. Likewise, the angle of correction α8 corresponds to a first configuration of the first cylinder 3.

The measuring system makes it possible to measure data L103 relative to the inclination of the arm 2a of the boom 2.

α denotes an angle defined between the axis Z1 and the longitudinal axis X2 of the boom 2 in a plane perpendicular to the axis Y1. The angle α is located, in FIG. 1, in the upper left quadrant. In the configuration of FIG. 1, the angle α is equal to 90°.

The sensors 6 are connected to the control unit 5 by wired connections not shown which allow the sensors 6 to transmit to the control unit 5 information relative to the values that they are measuring. Alternatively, the means of connecting between the sensors 6 and the control unit 5 are wireless.

The machine 1 is also provided with a mechanism for raising/lowering the boom 2 according to the axis Z1. Alternatively, the mechanism for raising/lowering the boom 2 is according to the axis Zg. The mechanism for raising/lowering comprises a second cylinder 30 which can be hydraulic or electrical, but other actuators can be suitable.

The second cylinder 30 comprises a rod 302 and a body 304. The rod 302 comprises an upper end which is located opposite the body 304 of the second cylinder 30 and which is articulated in rotation with the machine 1 around the axis Y1.

The body 304 of the second cylinder 30 is connected to the slideway 9 by a bar 306. A lower end of the bar 306, opposite the body 304 of the second cylinder 30, is articulated in rotation with the slideway 9 around an axis Y9' parallel to the axis Y1. The axes Y1, Y2, Y9 and Y9' are aligned along the axis Z1.

The translation of the rod 302 of the second cylinder 30 causes the translation of the boom 2 according to the axis Z1, by the intermediary of the connecting rod 8 and of the slideway 9, which moves closer or separates the boom 2 from the surface S.

The slideway 11 is provided with an optional measuring system 130 which makes it possible to measure a distance L130 corresponding to the position of the slideway 11 in relation to the frame 12, along the axis Z1. The magnitude L130 corresponds to a configuration of the second cylinder 30, i.e. to a particular arrangement of the rod 302 in relation to the body 304 of the second cylinder 30. The measuring system 130 is connected to the control unit 5 by a connection not shown which can be wired or wireless. Alternatively, the measuring system 130 can be integrated into the second cylinder 30.

In another embodiment, not shown, wherein the mechanism for inclining and/or the mechanism for raising/lowering include an actuator other than a cylinder, the measuring systems 103 and 130 are replaced with other measuring systems, adapted to these actuators, making it possible to measure a magnitude corresponding to a configuration of these actuators.

The translation of the rod 32 of the first cylinder 3 causes the inclination of the longitudinal axis X2 of the boom 2 in the plane X1-Z1, i.e. the variation of the angle α.

The machine 1 is provided with a manual system for controlling the first cylinder 3. The manual control system comprises, for example, a first controller 38 placed in the cabin of the machine 1 in the vicinity of the steering wheel 11.

The first controller 38 is connected to the first cylinder 3 by a first wired connection 51.

The manual system for controlling the first cylinder 3 allows the user to vary the angle α, i.e. to vary the inclination of the boom 2 around the axis Y2, in the plane X1-Z1, with the purpose of making it parallel to the surface S.

The boom 2 is provided with an inclinometer 7, which measures the angle α. The first cylinder 3 is connected to the control unit 5 by a wired connection 50 which makes it possible for the control unit 5 to control the first cylinder 3.

The second cylinder 30 is connected to the control unit 5 by a wired connection 50' which allows the control unit 5 to control the second cylinder 30.

The machine 1 is also provided with a manual system for controlling the second cylinder 30. This manual control system comprises, for example, a second controller 38' placed in the cabin of the machine 1 in the vicinity of the steering wheel 11. The second controller 38' is connected to the second cylinder 30 by a wired connection 51'.

Alternatively, the wired connections 50, 50', 51 and 51' are wireless. The cabin of the machine 1 is configured in such a way that the user can simultaneously control the means for moving the machine 1, with the steering wheel 11, and the manual systems for controlling the first cylinder 3 and the second cylinder 30, i.e. the controllers 38 and 38'.

The rest of the description relates to a first method for spraying a phytosanitary liquid on vegetation planted in the land, by means of the machine 1.

This method comprises an initial step a), wherein the user enters into the control unit 5 the value of a minimum distance $d_{min}$ and the value of a maximum distance $d_{max}$ greater than the minimum distance $d_{min}$.

The minimum distance $d_{min}$ can be between 30 cm and 70 cm, preferably of a magnitude of 50 cm.

The maximum distance $d_{max}$ can be between 70 cm and 150 cm, preferably of a magnitude of 100 cm.

The first method comprises a prior step b) which can be carried out before or after the vegetation has been planted in the land. In the prior step b), before the machine 1 proceeds with the spraying of the phytosanitary liquid on the vegetation, or during a previous spraying, the machine 1 travels over the land, at a speed V1 more preferably rather slow, according to a predetermined trajectory T, in such a way that the boom 2 sweeps the entire surface S of the land whereon the vegetation is or will be planted.

Simultaneously, during the prior step b), the user manoeuvres, over the entire trajectory T, with precision and without haste, the manual control system 38 of the cylinder 3 and the manual control system 38' of the second cylinder 30, in such a way that the distance d between each sensor 6 and the surface S or the vegetation planted in the land is between the minimum distance $d_{min}$ and the maximum distance $d_{max}$. More preferably, the user manoeuvres the control systems 38 and 38' in such a way that the distance d between each sensor 6 and the surface S or the vegetation is substantially equal to an optimum distance $d_{opt}$. The optimum distance $d_{opt}$ allows for an optimum spray. The optimum distance $d_{opt}$ can be between 50 cm and 100 cm, preferably of a magnitude of 70 cm. The prior step b) can be advantageously carried out while the machine 1 is moving at a first low speed V1, i.e. at which the user can control the cylinder 3 precisely.

During the prior step b), the control unit 5 records in its memory 52, for the sampled positions of the machine 1 along the trajectory T, on the one hand the distance d between each sensor 6 and the surface S or the vegetation and, on the other hand, at least one piece of data relative to the inclination of the boom 2. For example, this operation can be carried out every 50 cm along the trajectory T of the machine. The data or piece of data relative to the inclination of the boom 2 can be the angle $\alpha$, measured by the inclinometer 7, the angle of correction $\alpha 8$, measured by the sensor 70 and/or the length L103, measured by the measuring system 103.

Optionally, during the prior step b), the control unit 5 records in its memory 52, for sampled positions of the machine 1 along the trajectory T, the length L103 corresponding to the configuration of the first cylinder 3.

Likewise, optionally, during the prior step b), the control unit 5 records in its memory 52, for sampled positions of the machine 1 along the trajectory T, the length L130 corresponding to the configuration of the second cylinder 30.

Advantageously but not mandatorily, during the prior step b), as soon as the distance d measured by at least one sensor 6 is less than the minimum distance $d_{min}$, the control unit 5 automatically controls the second cylinder 30 in order to separate the boom 2 from the surface S until the distance d measured by each sensor 6 is greater than or equal to the optimum distance $d_{opt}$. This controlling is carried out with priority, i.e. the lifting of the boom 2 is carried out even if the user manually controls the cylinders 3 and 30. Indeed, this controlling makes it possible to prevent the collision between the boom 2 and the land, which is essential.

Likewise, advantageously but not mandatorily, during the initial step a), the user enters into the control unit 5 the value of an optimum distance $d_{opt}$ between the minimum distance $d_{min}$ and the maximum distance $d_{max}$. During the prior step b), the control unit 5 automatically controls the first cylinder 3 and/or the second cylinder 30 in such a way that the distance d measured by each sensor 6 is substantially equal to the optimum distance $d_{opt}$.

In addition, during the prior step b), the user can use the controllers 38 and 38' to, where applicable, manually correct the controlling of the control unit 5.

At the end of the prior step b), the memory 52 of the control unit 5 has recorded, according to the positions of the machine 1 sampled, the angle $\alpha$, the distance d between each sensor 6 and the land or the vegetation and possibly the lengths L103 and L130.

In a step of spraying c), successive in step b), and while the boom 2 sprays the phytosanitary liquid, the machine 1 travels over the surface S of the vegetation, at a second speed V2 greater than or equal to the first speed V1, according to the trajectory T travelled during the prior step b). Ideally, the trajectory T travelled by the machine 1 during the step of spraying c) is exactly the same as the trajectory T travelled during the prior step b). In practice, the two trajectories can be slightly different.

In the step of spraying c), for each sampled position in prior step b) and according to the data d and $\alpha$, $\alpha 8$, and/or L103 and possibly L130 recorded by the sensors 6 and the inclinometer 7, the sensor 70 and/or the measuring system 103 and possibly the measuring system 130 in prior step b), the control unit 5 automatically controls the first cylinder 3 and the second cylinder 30, in such a way that the distance d between each sensor 6 and the land or the vegetation is between the minimum distance $d_{min}$ and the maximum distance $d_{max}$ that were predetermined during the initial step a). During the step of spraying c), the control unit 5 can advantageously, but not mandatorily, control the first cylinder 3 and/or the second cylinder 30 in such a way that, for each sampled position in prior step b), the inclination $\alpha$ of the boom 2 is similar to the inclination $\alpha$ defined manually by the user during the prior step b).

Advantageously but not mandatory, during the step of spraying c), the control unit 5 can control the first cylinder 3 and the second cylinder 30 in such a way that, for each sampled position in prior step b), the distance d measured by each sensor 6 is substantially equal to the optimum distance $d_{opt}$ defined previously. In any case, the distance d measured by each sensor 6 is between the minimum distance $d_{min}$ and the maximum distance $d_{max}$.

Advantageously, the control unit 5 is programmed to control the first cylinder 3 and the second cylinder 30, ahead of time, i.e. slightly in advance over the next sampled position, in such a way that the boom 2 is inclined at a speed that does not cause any instability. For example, during the step of spraying c), when the machine 1 is located at a sampled position during the prior step b), the control unit 5 can initiate the translation of the rod 32 or 302 of the first or of the second cylinder 3 or 30 and translate this rod progressively until the machine 1 reaches the following sampled position.

In particular, the control unit 5 can anticipate, thanks to the knowledge of the configuration of the cylinders 3 and 30, corresponding to the lengths L103 and L130, during its next sampled position, the variations in the geometry of the land, by also using as a base the information d, $\alpha$ and/or $\alpha 8$ recorded by the sensors 6 and the inclinometer 7 and/or the sensor 70 during the prior step b), which allows the control unit 5, during the step of spraying c), to control the moving of the rods 32 and 302 of the cylinders 3 and 30 at a speed that does not cause any parasite movements of the boom 2 caused by the inertia.

The rest of the description relates to a second method for spraying a phytosanitary liquid on vegetation planted on the land by means of the machine 1.

This second method comprises an initial step a2), wherein, before the spraying, the user enters into the control unit 5 the value of the minimum distance $d_{min}$ and the value of the optimum distance $d_{opt}$.

In a prior step b2), after the initial step a2), the machine 1 travels over the surface S of the land, at a first speed V1, according to a determined trajectory T, in such a way that the boom 2 sweeps the entire surface S. As soon as the distance d measured by at least one sensor 6 is less than the minimum distance $d_{min}$ entered during the initial step a2), the control unit 5 controls the second cylinder 30, until the distance d measured by this sensor 6 is equal to the optimum distance $d_{opt}$. The user manoeuvres the manual control system 38 of the first cylinder 3 in such a way that the distance d measured by each sensor 6 is globally equal to the optimum distance $d_{opt}$. At each time that the user actuates the manual control system 38 of the first cylinder 3, the control unit 5 records in its memory 52 the position of the machine 1 along the trajectory T and either a duration of this actuation, or a distance travelled by the machine 1 during this actuation and, a few seconds after the end of this actuation, a first piece of data $\alpha$, $\alpha 8$ or L103 relative to the inclination of the arm 2a corresponding to the manual control system 38 actuated by the user.

In a step of spraying c2), after the prior step b2) and during the spraying, the machine 1 travels over the surface S, at a second speed V2 greater than or equal to the first speed V1, according to the trajectory T travelled during the prior step b2). The maintaining of the same speed V1 and V2 makes it possible to incorporate the effects of the inertia of the boom 2. When the machine 1 reaches one of the positions recorded during the prior step b2), the control unit 5 controls the first cylinder 3 actuated, for this position, by the user in prior step b2), either during a duration equal to the corresponding duration of actuation recorded during the prior step b2), or until the machine 1 has travelled a distance equal to the corresponding distance travelled during the prior step b2). A few seconds after the end of the actuation, the control unit 5 compares a second piece of data α, α8 or L103 relative to the inclination of the corresponding arm 2a with the first piece of corresponding data α, α8 or L103 recorded during the prior step b2) and, if the second piece of data α, α8 or L103 differs by plus or minus 1% from the first piece of data, the control unit 5 controls the first cylinder 3 in the direction for reducing the difference between the second piece of data α, α8 or L103 and the first piece of data α, α8 or L103. This controlling can be carried out via successive pulses.

FIG. 3 corresponds to a second embodiment of the invention wherein the machine 1 is provided with a spraying boom 2 which comprises three articulated arms 2a, 2b and 2c. In FIG. 2, the elements similar to those of FIG. 1 bear the same reference numbers to which is possibly added either the letter "a", in the case where the element relates to the arm 2a, or the letter "b", in the case where the element relates to the arm 2b, or the letter "c" in the case where the element relates to the arm 2c. The arm 2a is centred on the axis Z1 and is located between the arm 2b and the arm 2c. The arm 2a constitutes a "central frame" for the boom 2.

X2a denotes a longitudinal axis of the central frame 2a, X2b a longitudinal axis of the arm 2b and X2c a longitudinal axis of the arm 2c.

The central frame 2a of the boom 2 is connected to the machine 1 by a structure similar to that described in reference to the first embodiment. This structure comprises a first cylinder 3a, which corresponds to the cylinder 3 of FIG. 1, a connecting rod 8, a slideway 9, two rails 11 and 11' and a second cylinder 30. The cylinder 3a allows for the inclination of the central frame 2a in relation to the frame 12 of the machine 1, around the axis Y2 and in a plane X2a-Z1 perpendicular to the axis Y2.

αa denotes an angle located on the side of the arm 2c in relation to the axis Z1 and defined in the plane X2a-Z1, between the axes X2a and Z1. In FIG. 1, the angle αa is located in the upper right quadrant. The plane X2a-Z1 passes through the axes X2a and Z1 and is perpendicular to the forward direction Y1 of the machine 1.

Optionally, the boom 2 is provided with a sensor not shown, similar to the sensor 70 of the machine 1 in accordance with the first embodiment, for measuring an angle of correction, similar to the angle α8 and defined between the connecting rod 8 and the longitudinal axis X2a of the central frame 2a.

The arm 2b is articulated in rotation with a first axial end 24 of the central frame 2a around an axis Yb parallel to the axis Y1. To do this, the central frame 2a is provided with an element 21 that cooperates with an element 21b, fixed on a first end 24 of the arm 2b, in order to form the articulation. The machine 1 is provided with a cylinder 3b of which a first end is articulated in rotation, around an axis Y3b, with the arm 2b and of which a second end is articulated in rotation, around an axis Y2b, with the central frame 2a. The axes Y2b and Y3b are parallel to the axis Y1.

Optionally, the boom 2 is provided with a sensor not shown in order to measure an angle, referred to as angle of geometry, defined between the longitudinal axis X2b of the arm 2b and the longitudinal axis X2a of the central frame 2a.

Zb denotes a first reference axis, fixed in relation to the frame 12 of the machine 1, parallel to the axis Z1. In FIG. 3, the axis Zb is confounded with the axes Yb and Y2b. However, when the boom 2 is inclined, the axis Zb no longer passes through the axes Yb and Y2b.

The arm 2c is articulated in rotation with a second axial end 26 of the central frame 2a around an axis Yc parallel to the axis Y1. To do this, the central frame 2a is provided with an additional element 21 that cooperates with an element 21c, fixed on a first end 24 of the arm 2c, in order to form the articulation. The machine 1 is provided with an additional cylinder 3c of which a first end is articulated in rotation, around an axis Y3c, with the arm 2c and of which a second end is articulated in rotation, around an axis Y2c, with the central frame 2a.

Optionally, the boom 2 is provided with a sensor not shown in order to measure an angle, referred to as angle of geometry, defined between the longitudinal axis X2c of the arm 2c and the longitudinal axis X2a of the central frame 2a.

Zc denotes a second reference axis, fixed in relation to the frame 12 of the machine 1, parallel to the axis Z1. In FIG. 3, the axis Zc is confounded with the axes Yc and Y2c. However, when the boom 2 is inclined, the axis Zc no longer passes through the axes Yc and Y2c.

The sensors not shown for measuring angles of correction and of geometry are connected to the control unit 5 by wired or wireless connections not shown, and each make it possible to measure data relative to the inclination of the arms 2a, 2b and 2c.

The angle of correction and the angles of geometry are magnitudes that each correspond to a configuration of the cylinder 3, 3a, 3b or 3c, similarly to the magnitudes L103 and L130.

The translation of the rod of the cylinder 3b or 3c causes the inclination of the arm 2b or 2c in the plane X2a-Z1, around the axis Yb or Yc, in relation to the reference axis Zb or Zc and therefore in relation to the axis Z1. The cylinders 3a, 3b and 3c make it possible to incline the arms 2a, 2b and 2c in relation to the frame 12 of the machine 1.

αb denotes an angle located on the side of the arm 2b in relation to the axis Zb and defined in the plane X2a-Z1, between the axes Zb and X2b. αc denotes an angle located on the side of the arm 2c in relation to the axis Zc and defined in the plane X2a-Z1 between the axes Zc and X2c. In the configuration of FIG. 3, the angles αa, αb and αc are equal to 90°. The angles αb and αc correspond to the inclination of the arms 2b and 2c in the plane X1-Z1. Alternatively, the angle αa is defined between the axes X2a and 19, the angle αb is defined between the axes X2b and 19 and the angle αc is defined between the axes X2c and 19.

In an alternative not shown, the machine 1 comprises, for at least one of the arms 2a, 2b and/or 2c of the boom 2, a mechanism for inclining this or these arms 2a, 2b and/or 2c in the plane X2a-Z1, i.e. that at least one arm 2a, 2b or 2c may not include a mechanism for inclining.

Each arm 2a, 2b and 2c is provided with two sensors 6a, 6b or 6c which are located on each axial end 24 and 26 of the arm 2a, 2b or 2c and which each measure their own distance d, as shown in FIG. 1.

In an alternative not shown, at least one of the arms 2a, 2b and/or 2c of the boom 2 are provided with a sensor 6a, 6b or 6c, i.e. that at least one arm of the boom 2 may not include a sensor.

The machine 1 is provided with a manual system for controlling cylinders 3a, 3b and 3c which allows the user to separately control the cylinders 3a, 3b and 3c. This manual control system comprises a first controller 38a, a second controller 38b and a third controller 38c. The first controller 38a is connected to the cylinder 3a by a wired connection 50a which allows the user to manually control the inclination of the central frame 2a, i.e. to vary the angle αa. The second controller 38b is connected to the cylinder 3b by a wired connection 50b which allows the user to manually control the inclination of the arm 2b, i.e. to vary the angle αb.

The third controller 38c is connected to the cylinder 3c by a wired connection 50c which allows the user to manually control the inclination of the arm 2c, i.e. to vary the angle αc.

The machine 1 is provided with a manual control system 38' of the cylinder 30 which comprises a controller 38' connected to the cylinder 30 by a wired connection 51'.

The wired connections 50a, 50b, 50c and 51' can be wireless.

The machine 1 is provided with a control unit 5 which comprises a memory 52 and which is connected to the cylinder 30 by a wired connection 50'. Each sensor 6a, 6b and 6c is connected to the control unit 5 by wired connections not shown. These connections can also be wireless.

Each arm 2a and 2b is provided with an inclinometer 7a, 7b or 7c for measuring the angle αa, αb or αc and with two sensors 6a, 6b or 6c which each measure a distance d similar to that of the embodiment of FIG. 1.

In an alternative not shown, at least one of the arms 2a, 2b and/or 2c of the boom 2 are provided with an inclinometer 7a, 7b or 7b, i.e. that at least one arm of the boom 2 may not includes an inclinometer.

Each sensor 6a, 6b and 6c and each inclinometer 7a, 7b and 7c is connected to the control unit 5 by wired connections not shown. These connections could also be the wire.

The first method of spraying phytosanitary liquid by means of the machine 1 in accordance with the second embodiment is similar to the method described in reference to the first embodiment.

However, during the prior step b), the user manoeuvres, over the entire trajectory, the manual control system 38a, 38b and 38c of each cylinder 3a, 3b and 3c.

In addition, during the prior step b), the control unit 5 records in its memory 52, for the sampled positions of the machine 1 over the surface of the vegetation, the distance d measured by each sensor 6a, 6b and 6c and at least one piece of data relative to the inclination of each arm 2a, 2b and 2c of the boom 2. The data relative to the inclination of each arm 2a, 2b and 2c of the boom 2 can be the angles αa, αb and αc, the angles of geometry, the angle of correction and/or magnitudes corresponding to a configuration of the cylinders 3a, 3b and 3c.

The step of spraying c) of the second embodiment is similar to the step of spraying c) of the first mode. However, the control unit 5 independently controls each cylinder 3a, 3b and 3c, as well as the second cylinder 30.

The second method of spraying phytosanitary liquid by means of the machine 1 in accordance with the second embodiment is similar to the method described in reference to the first embodiment. However, during the prior step b2), the user manoeuvres each controller 38a, 38b and 38c in order to control the inclination of each arm 2a, 2b and 2c and the control unit 5 records in its memory 52 a piece of data αa, αb, αc relative to the inclination of each arm 2a, 2b and 2c. In addition, during the step of spraying c2), the control unit 5 controls the arms 2a, 2b, 2c corresponding to the arms 2a, 2b, 2c which were controlled by the user during the prior step b2), according to the data αa, αb, αc relative to the inclination of the arms 2a, 2b, 2c.

In other embodiments of the invention, not shown, the number and the location of the sensors 6, 6a, 6b and 6c on the boom 2 can vary. Likewise, each arm 2a, 2b and 2c of the boom 2 can comprise a number of inclinometers greater than 1.

Moreover, the boom 2 can comprise a variable number of arms. For example, on each side of the central frame 2a, the boom 2 can comprise two arms articulated together.

In an alternative not shown, the boom 2 and the arms 2a, 2b and 2c of the boom 2 are inclined around an axis which is not parallel to the forward direction Y1 of the machine 1. As such, the boom 2 and the arms 2a, 2b and 2c of the boom 2 can be mobile in rotation around an axis which is inclined in relation to the forward direction Y1. In this case, the rotation of the boom 2 and of the arms 2a, 2b and 2c is not carried out in the plane X1-Z1 or in the plane X2a-Z1.

On the other hand, the mechanisms for inclination 3, 3a, 3b, 3c of the boom 2, the mechanism for raising/lowering 30 and the means for fastening the boom 2 to the machine 1 shown are not restrictive, as the invention can be implemented for machines that are different from the tractors shown in the figures. For example, the mechanism for raising/lowering 30 can be of the deformable double parallelogram type.

Furthermore, the embodiments described are not restrictive and their characteristics can be combined.

The invention claimed is:

1. A method for spraying a phytosanitary liquid on vegetation planted on a land by means of an agricultural spraying machine for cultivated land, wherein the method comprises:

an initial step a), wherein, before the spraying, a user enters into a control unit a value of a minimum distance and a value of a maximum distance greater than the minimum distance, a prior step b) wherein, the machine travels over a surface of the land, at a first speed, according to a determined trajectory, in such a way that a boom sweeps the surface in its entirety, with the user manoeuvring, over the trajectory in its entirety, a manual control system of each mechanism for inclining and/or a manual control system of the mechanism for raising/lowering, in such a way that the distance between each sensor and the surface, if the surface is free of vegetation, or the vegetation planted on the land, if there is vegetation planted on the land, is between the maximum distance and the minimum distance, the control unit records in its memory, for sampled positions of the machine along the trajectory, on the one hand, the distance between each sensor and the land or the vegetation and, on the other hand, at least one data, relative to the inclination of each arm, a step of spraying c), after the step b), wherein, during the spraying, the machine travels over the surface, at a second speed greater than or equal to the first speed, according to the trajectory travelled during the prior step b) and for each sampled position in prior step b) and according to the data stored in the memory, the control unit controls, ahead of time, the mechanism for raising/lowering and each mechanism for inclining, in such a way that the distance between each sensor and the land or the vegetation is between the maximum distance and the minimum distance and wherein the agricultural machine comprises means for moving the machine over the surface of land, a spray boom for spraying the phytosanitary liquid, comprising at least one arm, for the arm or for at least one of the arms of the boom, a mechanism for inclining the arm in relation to a frame of the agricultural machine, a mechanism for raising/lowering the boom according to a first axis fixed in relation to the frame of the machine and vertical, and even substantially vertical when the machine is on a planar horizontal surface or in relation to a second axis of the same direction as the earth's gravity field, a manual control system for controlling each mechanism for inclining and for controlling the mechanism for raising/lowering, a receiver able to communicate with a global positioning system and a control unit, the arm or at least one of the arms of the boom being provided with at least one sensor, each sensor measuring a distance between the surface of the land and this sensor, if the surface is free of vegetation, or between vegetation planted on the land and this sensor, if there is vegetation planted on the land, wherein the arm or the at least one of the arms of the boom is provided with a measuring element for measuring a data relative to the inclination, in a plane perpendicular to the forward direction, of a longitudinal axis of the arm and wherein the control unit is connected to each sensor, to the receiver and to the measuring element, provided with a memory for storing information provided by each sensor, by the receiver and by each measuring element and able to control each mechanism for inclining and the mechanism for raising/lowering depending on the information stored in the memory.

2. The method of spraying according to claim 1, characterised in that during the step of spraying c), the control unit controls ahead of time each mechanism for inclining in such a way that, for each sampled position in prior step b), the inclination of each arm is similar to the inclination of each arm defined by the user during the prior step b).

3. The method of spraying according to claim 1, wherein a mechanism for raising/lowering and/or at least one mechanism for inclining are provided with a system for measuring a magnitude corresponding to a configuration of this or these mechanisms wherein during the prior step b), the control unit records in its memory, for sampled positions of the machine along the trajectory, at least one magnitude corresponding to a configuration of the mechanism for raising/lowering and/or of at least one or of the mechanism for inclining and wherein during the step of spraying c), for each sampled position in prior step b), the control unit automatically controls and ahead of time the mechanism for raising/lowering and/or at least one or the mechanism for inclining in such a way that each magnitude is equal to the magnitudes recorded during the prior step b).

4. The method of spraying according to claim 1, wherein during the initial step a), the user enters into the control unit the value of an optimum distance, between the minimum distance and the maximum distance, and in that during the step of spraying c), the control unit automatically controls and ahead of time each mechanism for inclining and the mechanism for raising/lowering in such a way that, for each sampled position in prior step b), the distance (d) measured by each sensor is substantially equal to the optimum distance.

5. The method of spraying according to claim 1, wherein, during the initial step a), the user enters into the control unit the value of an optimum distance, between the minimum distance and the maximum distance, and, during the prior step b), as soon as the distance measured by at least one sensor is less than the minimum distance, the control unit automatically controls and with priority the mechanism for raising/lowering in order to separate the boom from the surface until the distance measured by each sensor is greater than or equal to the optimum distance.

6. The method of spraying according to claim 1, wherein, during the initial step a), the user enters into the control unit the value of an optimum distance, between the minimum distance and the maximum distance, and, during the prior step b), the control unit automatically controls the mechanism for raising/lowering and/or the or at least one mechanism for inclining in such a way that the distance (d) measured by each sensor is substantially equal to the optimum distance, the user manoeuvring the manual control system of the mechanism for raising/lowering and/or the manual control system of each mechanism for inclining in order to correct the controlling of the control unit.

7. The method for spraying a phytosanitary liquid on vegetation planted on a land by means of an agricultural machine, wherein the agricultural machine comprises:

means for moving the machine over the surface of land, a spray boom for spraying the phytosanitary liquid, comprising at least one arm, for the arm or for at least one of the arms of the boom, a mechanism for inclining the arm in relation to a frame of the agricultural machine, a mechanism for raising/lowering the boom according to a first axis fixed in relation to the frame of the machine and vertical, and even substantially vertical when the machine is on a planar horizontal surface or in relation to a second axis of the same direction as the earth's gravity field, a manual control system for controlling each mechanism for inclining and for controlling the mechanism for raising/lowering, a receiver able to communicate with a global positioning system and a control unit, the arm or at least one of the arms of the boom being provided with at least one sensor, each sensor measuring a distance between the surface of the land and this sensor, if the surface is free of vegetation, or between vegetation planted on the land and this sensor, if there is vegetation planted on the land, wherein the arm or the at least one of the arms of the boom is provided with a measuring element for measuring a data relative to the inclination, in a plane perpendicular to the forward direction, of a longitudinal axis of the arm and wherein the control unit is
connected to each sensor, to the receiver and to the measuring element,
provided with a memory for storing information provided by each sensor, by the receiver and by each measuring element and
able to control each mechanism for inclining and the mechanism for raising/lowering depending on the information stored in the memory;
and the method characterised in that it comprises:
an initial step a2), wherein, before the spraying, the user enters into the control unit the value of a minimum distance and the value of an optimum distance greater than the minimum distance,
a prior step b2), after the initial step a2), wherein,
the machine (1) travels over the surface of the land, at a first speed, according to a determined trajectory, in such a way that the boom sweeps the entire surface,
as soon as the distance (d) measured by at least one sensor is less than the minimum distance, entered during the initial step a2), the control unit controls the mechanism for raising/lowering, until the distance measured by this or these sensors is equal to the optimum distance,
the user manoeuvres the manual control system of each mechanism for inclining in such a way that the distance measured by each sensor is globally equal to the optimum distance,
at each time that the user actuates the manual control system of a mechanism for inclining, the control unit records in its memory the position of the machine along the trajectory and either a duration of this actuation, or a distance travelled by the machine during this actuation, and, a few seconds after the end of this actuation, the control unit records in its memory a first data relative to the inclination of the arm corresponding to the manual control system actuated, a step of spraying c2), after the prior step b2), wherein, during the spraying,
the machine travels over the surface of the land, at a second speed greater than or equal to the first speed, according to the trajectory travelled during the prior step b2) and
when the machine reaches one of the positions recorded during the prior step b2), the control unit controls the mechanism for inclining, actuated for this position by the user in prior step b2), either during a duration equal to the duration of the corresponding actuation recorded during the prior step b2), or until the machine has travelled a distance equal to the corresponding distance travelled during the prior step b2), and, a few seconds after the end of the actuation, the control unit (5) compares a second data relative to the inclination of the corresponding arm with the first corresponding data recorded during the prior step b2) and, if the second data differs by plus or minus 1% from the first data, the control unit controls this mechanism for inclining in a direction for reducing the difference between the second data and the first data.

8. The method of spraying according to claim 1, wherein the minimum distance is between 30 cm and 70 cm.

9. The method of spraying according to claim 1, wherein the minimum distance is between 70 cm and 150 cm.

10. The method of spraying according to claim 4, wherein the optimum distance is between 50 cm and 100 cm.

11. The method of spraying according to claim 1, wherein the minimum distance is 50 cm.

12. The method of spraying according to claim 1, wherein the minimum distance is 100 cm.

13. The method of spraying according to claim 4, wherein the optimum distance is 70 cm.

\* \* \* \* \*

UNITED STATES PATENT AND TRADEMARK OFFICE
CERTIFICATE OF CORRECTION

PATENT NO. : 9,565,847 B2  
APPLICATION NO. : 15/073421  
DATED : February 14, 2017  
INVENTOR(S) : Ballu Page 1 of 1

It is certified that error appears in the above-identified patent and that said Letters Patent is hereby corrected as shown below:

On the Title Page

Item [63]:

Delete "Continuation of application No. 13/824,916, filed application No. PCT/FR2010/052296 on Oct. 3, 2011."

Insert --Continuation of application No. 13/824,916, filed application No. PCT/FR2011/052296 on Oct. 3, 2011.--

Signed and Sealed this  
Fourth Day of April, 2017

Michelle K. Lee  
*Director of the United States Patent and Trademark Office*